(12) United States Patent
Vlastuin

(10) Patent No.: US 9,926,081 B2
(45) Date of Patent: Mar. 27, 2018

(54) AIRCRAFT TURBOPROPELLER

(71) Applicant: SNECMA, Paris (FR)

(72) Inventor: Jonathan Vlastuin, Charenton (FR)

(73) Assignee: SNECMA, Paris (FR)

( * ) Notice: Subject to any disclaimer, the term of this patent is extended or adjusted under 35 U.S.C. 154(b) by 283 days.

(21) Appl. No.: 14/892,309

(22) PCT Filed: May 21, 2014

(86) PCT No.: PCT/FR2014/051181
§ 371 (c)(1),
(2) Date: Nov. 19, 2015

(87) PCT Pub. No.: WO2014/188121
PCT Pub. Date: Nov. 27, 2014

(65) Prior Publication Data
US 2016/0122028 A1  May 5, 2016

(30) Foreign Application Priority Data

May 21, 2013 (FR) .................................. 13 54557

(51) Int. Cl.
*B64C 11/18* (2006.01)
*B64D 27/10* (2006.01)
*F01D 1/26* (2006.01)
*F01D 5/14* (2006.01)
*F04D 29/32* (2006.01)
(Continued)

(52) U.S. Cl.
CPC .............. *B64D 27/10* (2013.01); *B64C 11/18* (2013.01); *B64C 11/48* (2013.01); *F01D 1/26* (2013.01); *F01D 5/141* (2013.01); *F04D 29/324* (2013.01); *B64D 2027/005* (2013.01); *F02C 3/067* (2013.01); *F02K 3/072* (2013.01); *F05D 2220/36* (2013.01); *F05D 2240/303* (2013.01); *F05D 2240/304* (2013.01);
(Continued)

(58) Field of Classification Search
CPC . B64C 11/18; B64C 11/48; F01D 1/26; F01D 5/141; F04D 29/234; F04D 29/384; F05D 2240/303; F05D 2240/304; F05D 2240/307; B64D 2027/005; F02K 3/072
See application file for complete search history.

(56) References Cited

U.S. PATENT DOCUMENTS 4,784,575 A * 11/1988 Nelson .................... B64C 11/18
416/144
4,969,800 A * 11/1990 Parry ...................... B64C 11/18
416/238
(Continued)

OTHER PUBLICATIONS

International Search Report dated Sep. 15, 2014 in PCT/FR14/051181 Filed May 21, 2014.

*Primary Examiner* — Ninh H Nguyen
(74) *Attorney, Agent, or Firm* — Oblon, McClelland, Maier & Neustadt, L.L.P.

(57) ABSTRACT

An aircraft turbopropeller includes two coaxial contra-rotating unducted propellers, upstream and downstream respectively, each propeller including an annular row of blades. The blades of the downstream propeller have a reverse sweep in relation to that of the blades of the upstream propeller. The leading edges of the blades of the downstream propeller extend radially outwards from downstream to upstream, at least over a radially outer portion of the blades.

10 Claims, 1 Drawing Sheet

(51) Int. Cl.
 *B64C 11/48* (2006.01)
 *F02K 3/072* (2006.01)
 *F02C 3/067* (2006.01)
 *B64D 27/00* (2006.01)
(52) U.S. Cl.
 CPC .... *F05D 2240/307* (2013.01); *F05D 2260/96* (2013.01); *Y02T 50/66* (2013.01); *Y02T 50/673* (2013.01)

(56) References Cited

U.S. PATENT DOCUMENTS

| | | | | |
|---|---|---|---|---|
| 4,976,102 A | * | 12/1990 | Taylor | B64C 11/48 416/129 |
| 5,054,998 A | | 10/1991 | Davenport | |
| 5,190,441 A | * | 3/1993 | Murphy | B64C 11/008 415/119 |

* cited by examiner

AIRCRAFT TURBOPROPELLER

TECHNICAL FIELD

The present invention relates to an aircraft turboprop engine comprising two coaxial unducted propellers, which are upstream and downstream respectively. Said turboprop engine is of the open-rotor or unducted-fan type.

PRIOR ART

A turboprop engine of this type comprises two propellers each comprising an annular array of substantially radial blades. The propellers are generally contra-rotating and set into rotation by a power turbine of the turboprop engine.

This type of turboprop engine is particularly advantageous in terms of performance. However, a major disadvantage of this type of turboprop engine is the noise that it generates, said noise being caused in particular by the interaction of the wake or the vortex generated by the radially outer ends of the blades of the upstream propeller with the blades of the downstream propeller.

A solution to this problem has already been proposed which consists in reducing the outer diameter of the downstream propeller in order to prevent the above-mentioned wake from impacting the downstream propeller, said wake instead circulating around said propeller. However, this solution, which is referred to as "clipping", is not satisfactory from an aerodynamic point of view, because the loading of the rotor increases (quadratically), which penalises the yield. Moreover, in order to distribute the excess loading, it is necessary to increase the number of blades of the downstream propeller, or the number of chords of the blades thereof, which is disadvantageous in terms of mass or bulk.

One solution to this additional problem could consist, during the design, in redistributing the load over the upstream propeller. However, this solution would not be satisfactory because it would significantly increase the energy conveyed by the tip vortex. From a physical point of view, the aerodynamic load escapes in the form of a vortex sheet having an intensity which is proportional to the value of the traction required at the rotor of the propeller. The higher the upstream load, the more said vortex sheet conveys a considerable amount of energy. The impact of this sheet on a solid surface is the main origin of the above-mentioned noise.

The aim of the present invention is in particular to provide a simple, effective and economical solution to the above-mentioned problem.

SUMMARY OF THE INVENTION

The invention proposes an aircraft turboprop engine, comprising two coaxial unducted and contra-rotating propellers which are upstream and downstream respectively, each propeller comprising an annular array of blades, the blades of the downstream propeller having a sweepback which is inverted with respect to that of the blades of the upstream propeller, characterised in that the blades of the downstream propeller have their leading edges extending, at least on a radially outer portion of the blades, radially towards the outside, going from downstream to upstream.

In the prior art, the blades of the downstream propeller have their leading edges extending radially towards the outside, going from upstream to downstream. The present invention proposes the opposite, i.e. that the sweepbacks of the blades of the downstream propeller be inverted with respect to those in the prior art. In other words, instead of being curved downstream, the portions of radially outer ends of the blades of the downstream propeller are curved upstream.

The above-mentioned turbulences which are generated by the radially outer ends of the blades of the upstream propeller generally have a linear trajectory along the longitudinal axis of the turboprop engine, and a conical shape, the apex of which is oriented downstream. The turbulences are thus located on a circumference having a diameter which decreases with distance from the upstream propeller. Trajectory analyses have further demonstrated that the vortex of the upstream propeller interacts with the radially outer ends of the blades of the downstream propeller, in the region of the trailing edges of said blades. Curving the blades of the downstream propeller upstream rather than downstream makes it possible to give the downstream propeller a greater outer diameter without risking interaction of the turbulences with said propeller. The present invention can be combined with the prior art of clipping in order to reduce said clipping or, whilst maintaining a given amount of clipping, to reduce the upstream propeller/downstream propeller interactions at the vane head. The present invention thus makes it possible to find a compromise between increasing the yield and reducing the noise pollution.

Moreover, the inverted sweepback of the downstream propeller makes it possible to achieve better performance in the transonic range. The present invention makes it possible to increase the high-speed yield with the same amount of interaction noise as in the prior art, and to reduce the interaction noise for a high-speed yield which is at least equal to that in the prior art.

Advantageously, at least the portion of the leading edge of each blade of the downstream propeller, extending over between 50 and 90% (preferably between 30 and 95%, and more preferably between 10 and 98%) of the height or radial dimension of the blade, extends radially towards the outside, going from downstream to upstream.

The above-mentioned radially outer portion can be inclined by an angle a with respect to a plane which is perpendicular to the longitudinal axis of the turboprop engine, said angle a varying along said portion and having an absolute maximum value in the vicinity of the radially outer end of the blade. Said angle a can have an absolute maximum value of between 20 and 40°.

The blades of the downstream propeller can have radially outer apexes or ends which are inclined from upstream to downstream radially towards the inside, in such a way that the outer diameter of the blades, in the region of the leading edges thereof, is greater than said diameter, in the region of the trailing edges thereof.

The axial distance between the trailing edges of the blades of the upstream propeller and the leading edges of the blades of the downstream propeller varies preferably over the height or radial dimension of the propellers and is minimal in the region of the radially outer ends of the propellers.

The blades of the upstream propeller can have their trailing edges extending, at least on a radially outer portion of the blades, radially towards the outside, going from upstream to downstream.

DESCRIPTION OF THE DRAWINGS

The invention will be better understood, and other details, features and advantages of the invention will become apparent upon reading the following description, given by way of non-limiting example with reference to the accompanying drawings, in which.

DETAILED DESCRIPTION

Figure 1:
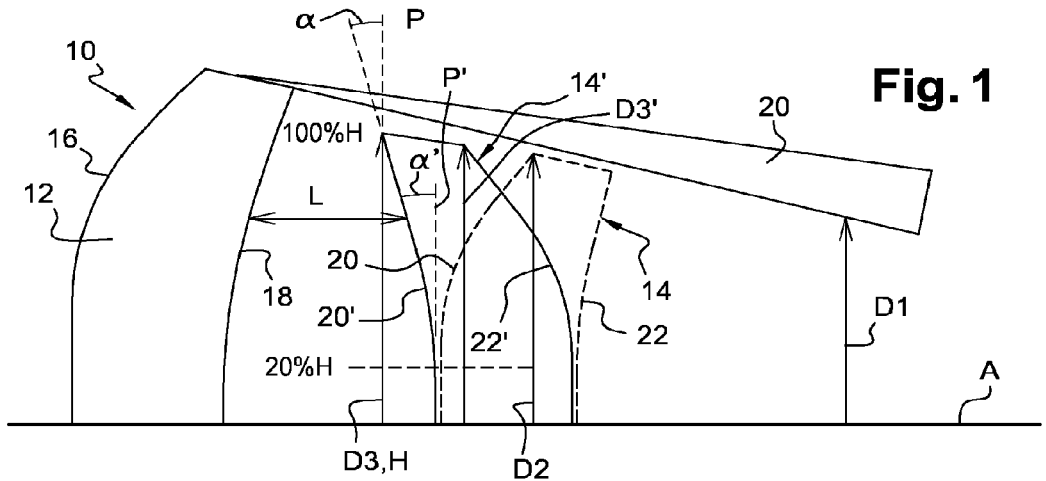
FIG. 1 is a very schematic, axial sectional half view of a turboprop engine having a pair of contra-rotating propellers.

FIG. 1 shows, in a very schematic manner, a turboprop engine 10 of the open-rotor or unducted-fan type, comprising two coaxial unducted and contra-rotating propellers, which are upstream 12 and downstream 14 respectively.

The upstream propeller 10 comprises an annular array of blades which each have a rear sweepback, i.e. they are cambered towards the rear or downstream of the turboprop engine (upstream and downstream referring to the direction of flow of the gases in the turboprop engine, which is directed from left to right in the drawing).

Each blade of the upstream propeller 12 typically comprises one edge 16 leading and one edge 18 trailing the air, the edges 16, 18 extending in this case from upstream to downstream radially towards the outside, with respect to the longitudinal axis A of the turboprop engine.

The radially outer ends of the blades of the upstream propeller 12 generate a wake 20 which has a substantially rectilinear trajectory along the axis A and which has a substantially conical shape, the apex of which is oriented downstream. The inner diameter D1 of said wake decreases from upstream to downstream along the axis A.

In the prior art shown in dotted lines, the downstream propeller 14 comprises an annular array of blades which each have a rear sweepback, i.e. they are also cambered downstream. The leading edges 20 and trailing edges 22 of the blades of the downstream propeller 14 extend from upstream to downstream radially towards the outside. The clipping consists in reducing the outer diameter D2 of said downstream propeller 14 in order to prevent the wake 20 from impacting the blades of said propeller.

The present invention provides another solution to the above-mentioned problem of noise pollution by means of inverting the sweepbacks of the blades of the downstream propeller.

The downstream propeller 14' of the turboprop engine according to the invention, which is shown in solid lines in FIG. 1, comprises an annular array of blades which each have a front sweepback, i.e. they are cambered upstream. The leading edges 20' and trailing edges 22' of the blades of the downstream propeller 14' extend from downstream to upstream radially towards the outside, which makes it possible to increase the outer diameter D3 of the propeller (D3>D2). Moreover, the apex of each blade of the downstream propeller 14' is inclined from upstream to downstream towards the inside to the extent that the outer diameter D3 of the blade, in the region of the leading edge 20' thereof, is greater than that D3' in the region of the trailing edge 22' thereof.

In the example shown, the radially inner portions of the blades have a sweepback which is substantially zero or slightly oriented upstream, and the radially outer portions of the blades have a front sweepback which is more marked.

Said front sweepback is achieved by the specific position of the leading edge 20' of each blade of the downstream propeller 14'. The angle α is defined as being the angle between the leading edge 20' and a plane P which is perpendicular to the axis A. Said angle a can also be defined as being the angle formed between a perpendicular passing through the axis A and tangent to a given point of the leading edge and the plane P or a radial axis. Said angle is preferably measured in a plane passing through the axis A and passing through the given point of the leading edge. In FIG. 1, the angle α is measured in relation to the plane P, and the angle α' is measured in relation to the plane P'.

The angle α varies along the height or radial dimension of the propeller 14'. The absolute value of the angle α is at its maximum at the radially outer end of the blade, said maximum absolute value being between 20 and 40°. The angle a is substantially zero in the region of the root of the blade.

In the example shown, the portion of the leading edge 20' of each blade of the downstream propeller 14', extending over between 20 and 100% of the height H or radial dimension of the blade, has a negative (non-zero) angle α.

In the case in which the radially outer end of the leading edge of each blade of the downstream propeller 14' is connected by a convex rounded edge to the apex of the blade, the sweepback of the blade can be considered to be reoriented towards the rear of said end. The corresponding portion of the leading edge 20', for example extending over between 98 and 100% of the height of the blade, can thus have a positive (non-zero) angle α.

The axial distance L between the trailing edges 18 of the blades of the upstream propeller 12 and the leading edges 20' of the blades of the downstream propeller 14' varies along the height H and reaches its minimum in the region of the outer periphery of the downstream propeller 14'.

Figures 2, 3:
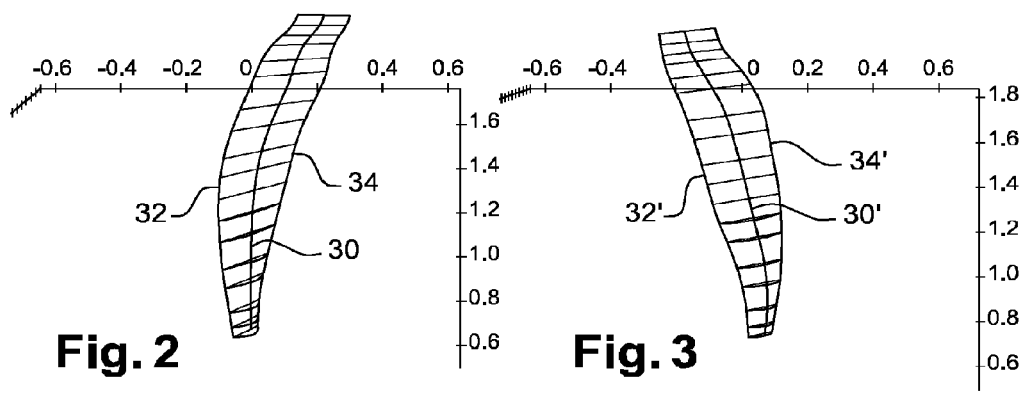
FIG. 2 is a graph showing the three-dimensional shape of a blade, having a rear sweepback, of a downstream turboprop engine propeller.
FIG. 3 is a graph showing the three-dimensional shape of a blade, having a (front) inverted sweepback, of a downstream turboprop engine propeller.

FIG. 2 schematically shows the three-dimensional shape of a blade having a rear sweepback from the prior art. The line 30 shows the bearing line of the blade and the lines 32 and 34 respectively show the leading 20 and trailing 22 edges of said blade. The sweepback can be defined as being the distance between the bearing line 30 and a radial axis, projected in the neutral plane of the propeller.

FIG. 3 schematically shows the three-dimensional shape of a blade having an inverted sweepback according to the invention, the line 30' showing the bearing line of the blade and the lines 32', 34' respectively showing the leading 20' and trailing 22' edges of said blade. Inverting the sweepback of a blade can amount to reconstructing the blade by requiring it to have a distribution which is equal to the opposite of the original.

Figure 4:
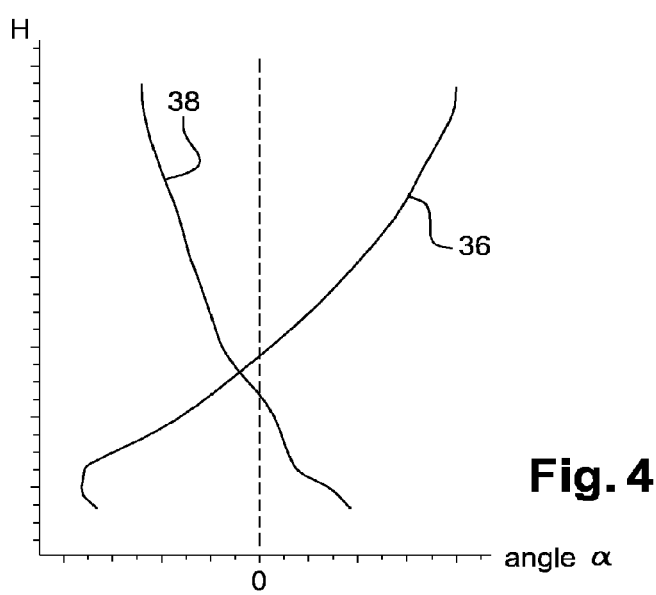
FIG. 4 is a graph showing the superimposed sweepbacks of the blades from FIGS. 2 and 3.

FIG. 4 shows the sweepbacks 36, 38 respectively of the blade having a rear sweepback from FIG. 2 and of the blade having an inverted sweepback from FIG. 3. In this drawing, the angle a is on the x-axis and the height of the downstream propeller is on the y-axis.

Experiments have made it possible to demonstrate that the potential gains in terms of yield can be significant in the case of the present invention. At high speed (MO=0.73 for example), at an equivalent level of traction, the configuration having an inverted sweepback on the downstream propeller shows a gain of approximately two points of yield at least, which can go up to four points for high levels of traction. If said two points of yield can be converted into an increase in clipping, it would be conceivable, according to the current art, to increase the clipping by approximately 10%, which would allow a significant reduction in the sound level of the assembly. At low speed (M0=0.2 for example), the gain in yield is still substantial. What is remarkable in particular about the pair of propellers according to the invention is the ability thereof to collect strong traction without yield loss.

The invention claimed is:

1. An aircraft turboprop engine, comprising:
two coaxial unducted and contra-rotating propellers which are upstream and downstream respectively, each propeller comprising an annular array of blades, the blades of the downstream propeller having a sweep-back which is inverted with respect to that of the blades of the upstream propeller,
wherein the blades of the downstream propeller have their leading edges extending, at least on a radially outer portion of the blades, radially towards an outside, going from downstream to upstream, and
wherein an axial distance between trailing edges of the blades of the upstream propeller and the leading edges of the blades of the downstream propeller varies along a radial position and reaches a minimum in a region of a radially outer end of the blade of the downstream propeller.

2. The turboprop engine according to claim 1, wherein the portion of the leading edge of each blade of the downstream propeller, extending over between 50 and 90% of a height or radial dimension of each blade, extends radially towards the outside, going from downstream to upstream.

3. The turboprop engine according to claim 1, wherein the portion of the leading edge of each blade of the downstream propeller, extending over between 30 and 95% of a height or radial dimension of each blade, extends radially towards the outside, going from downstream to upstream.

4. The turboprop engine according to claim 1, wherein the portion of the leading edge of each blade of the downstream propeller, extending over between 10 and 98% of a height or radial dimension of each blade, extends radially towards the outside, going from downstream to upstream.

5. The turboprop engine according to claim 1, wherein the radially outer portion is inclined by an angle a with respect to a plane which is perpendicular to a longitudinal axis of the turboprop engine, said angle a varying along said portion and having a maximum absolute value in a vicinity of the radially outer end of each blade.

6. The turboprop engine according to claim 5, wherein the angle a has an absolute maximum value of between 20 and 40°.

7. The turboprop engine according to claim 1, wherein the blades of the downstream propeller have radially outer apexes or ends which are inclined from upstream to downstream radially towards an inside, in such a way that an outer diameter of the blades, in a region of the leading edges thereof, is greater than said diameter, in a region of the trailing edges thereof.

8. The turboprop engine according to claim 1, wherein the axial distance between the trailing edges of the blades of the upstream propeller and the leading edges of the blades of the downstream propeller vary over a height or radial dimension of the propellers and is minimal in the region of the radially outer ends of the propellers.

9. The turboprop engine according to claim 1, wherein the blades of the upstream propeller have their trailing edges extending, at least on a radially outer portion of the blades, radially towards the outside, going from upstream to downstream.

10. The turboprop engine according to claim 1, wherein the two propellers are in a configuration where a gain in yield is sought for traction of each propeller.

* * * * *

UNITED STATES PATENT AND TRADEMARK OFFICE
CERTIFICATE OF CORRECTION

PATENT NO.         : 9,926,081 B2
APPLICATION NO.    : 14/892309
DATED              : March 27, 2018
INVENTOR(S)        : Jonathan Vlastuin Page 1 of 1

It is certified that error appears in the above-identified patent and that said Letters Patent is hereby corrected as shown below:

In the Specification

In Column 2, Line 42, delete "angle a" and insert --angle $\alpha$--;
    Line 44, delete "angle a" and insert --angle $\alpha$ --;
    Line 46, delete "angle a" and insert --angle $\alpha$--.

In Column 4, Line 7, delete "angle a" and insert --angle $\alpha$--;
    Line 19, delete "angle a" and insert --angle $\alpha$--;
    Line 56, delete "angle a" and insert --angle $\alpha$--.

In the Claims

In Column 6, Line 5, delete "angle a" and insert --angle $\alpha$--;
    Line 7, delete "angle a" and insert --angle $\alpha$--;
    Line 11, delete "angle a" and insert --angle $\alpha$--.

Signed and Sealed this
Thirty-first Day of December, 2019

Andrei Iancu
*Director of the United States Patent and Trademark Office*